Figure 1:
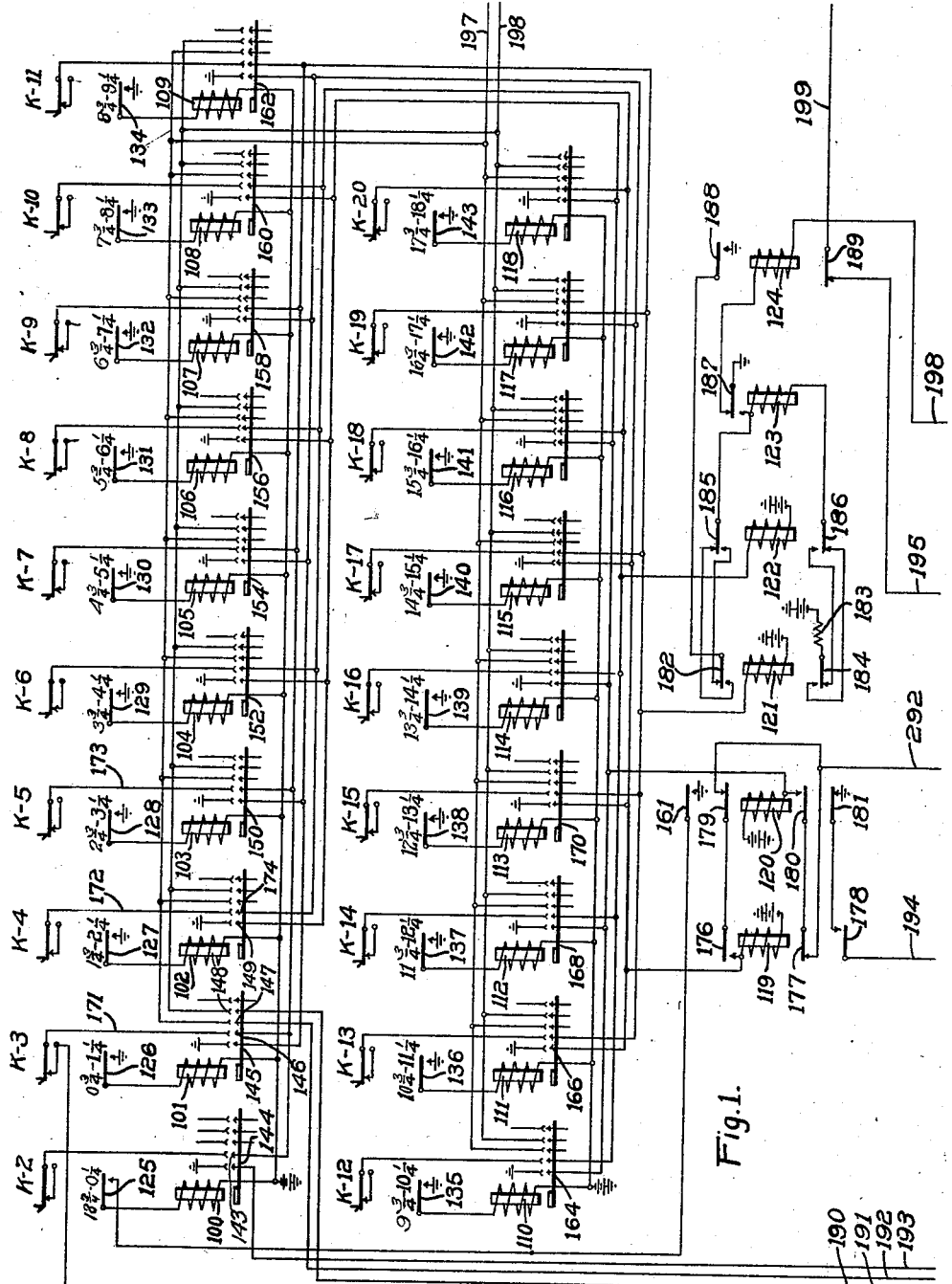

May 28, 1929. T. U. WHITE 1,714,970
SUPERVISORY CONTROL SYSTEM
Filed April 8, 1924 4 Sheets-Sheet 4

WITNESSES:

INVENTOR
Thomas U. White.
BY
ATTORNEY

Patented May 28, 1929.

1,714,970

UNITED STATES PATENT OFFICE.

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed April 8, 1924. Serial No. 704,996.

My invention relates to supervisory control systems and particularly to systems for supervising and controlling, from a central point, remotely-disposed electrical apparatus.

One object of my invention is to provide an improved supervisory control system employing synchronously-rotating devices at the central and the distant points, respectively.

Another object of my invention is to provide means for checking the synchronism of the synchronously-operating devices in each selecting position of the devices.

Another object of my invention is to provide means for starting synchronously-rotating devices at the dispatcher's office and station, respectively, when it is desired to control an apparatus unit or to send a supervisory signal, and for stopping the synchronously-rotating devices after the sending operation has been completed.

Another object of my invention is to provide means for operating the synchronously moving devices to select a particular apparatus unit and maintain connection therewith as long as desired.

A further object of my invention is to provide means for readily increasing the capacity of the system without great change in the construction of the synchronously operating devices.

There are other objects of the invention which, together with the foregoing, will be described hereinafter in connection with the accompanying drawings.

In practicing my invention, I provide a rotating device, similar in mechanical construction to the so-called sequence switch well known in the automatic telephone art and disclosed in Aitkens "Automatic Telephony" volume 1, published by Earnest Benn Limited, 8 Bouverie Street, E. C. 4, 1923, at both the dispatcher's office and station or substation in which is located the electrical equipment that it is desired to control and supervise. In addition, a group of selecting relays that are under the control of their respective sequence switches are provided at both the dispatcher's office and the substation. A control circuit is provided at the dispatcher's office for controlling the operation or rotation of the sequence switch. A similar control circuit is provided at the substation.

In addition, at the dispatcher's office, a group of supervisory lamps and controlling keys are provided for supervising and controlling the operation of the electrical equipment or apparatus units at the substation.

The dispatcher's office is connected to the substation by means of a three-conductor trunk line. The control circuits at the dispatcher's office and substation are connected together over a conductor of this trunk line and are so interlocked that the sequence switches under their respective control are rotated in synchronism.

Referring now to the drawings, comprising Figures 1 to 4, inclusive, I have shown, by means of conventional diagrams, sufficient apparatus and circuits to enable my invention to be readily explained and understood.

Figure 2:
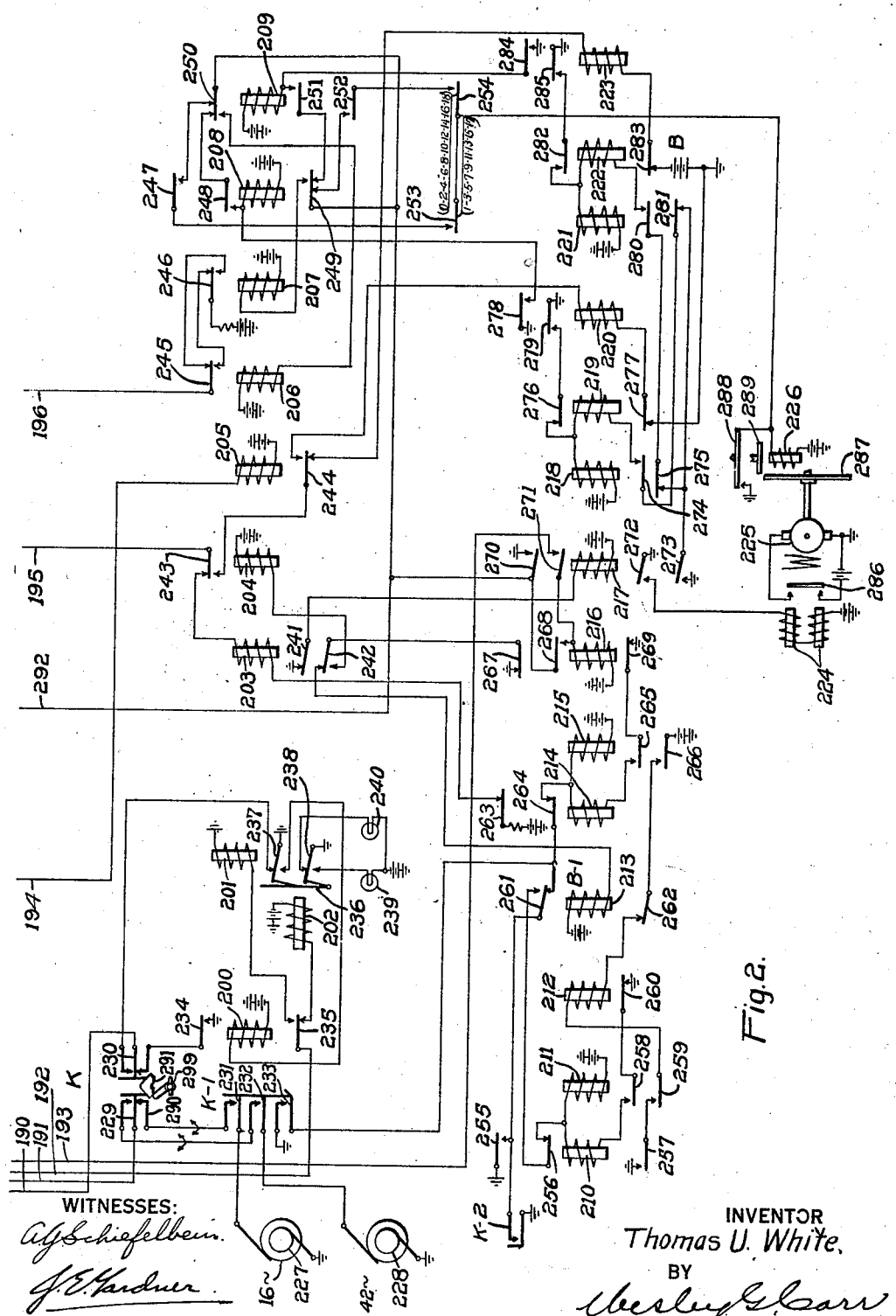
Figure 3:
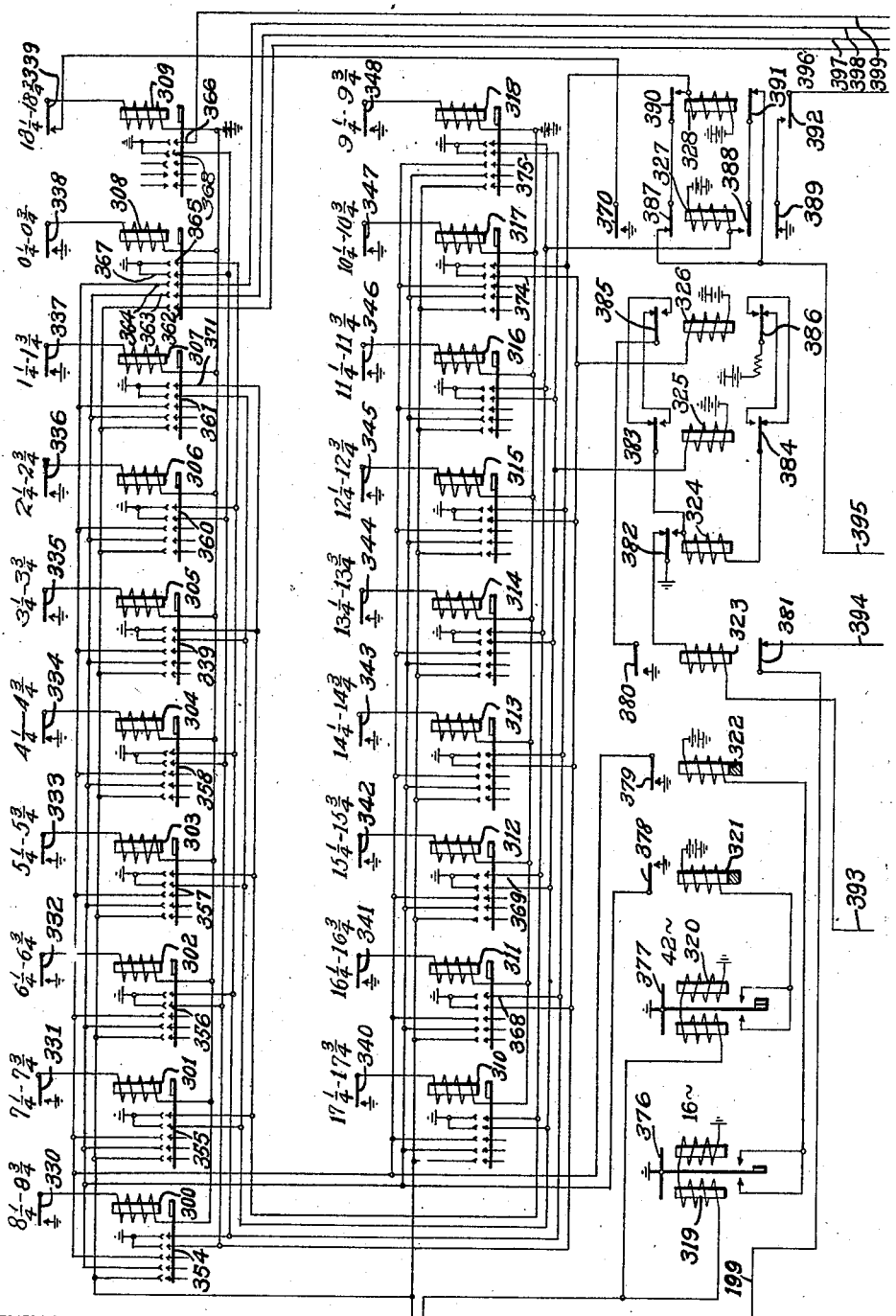
Figure 4:
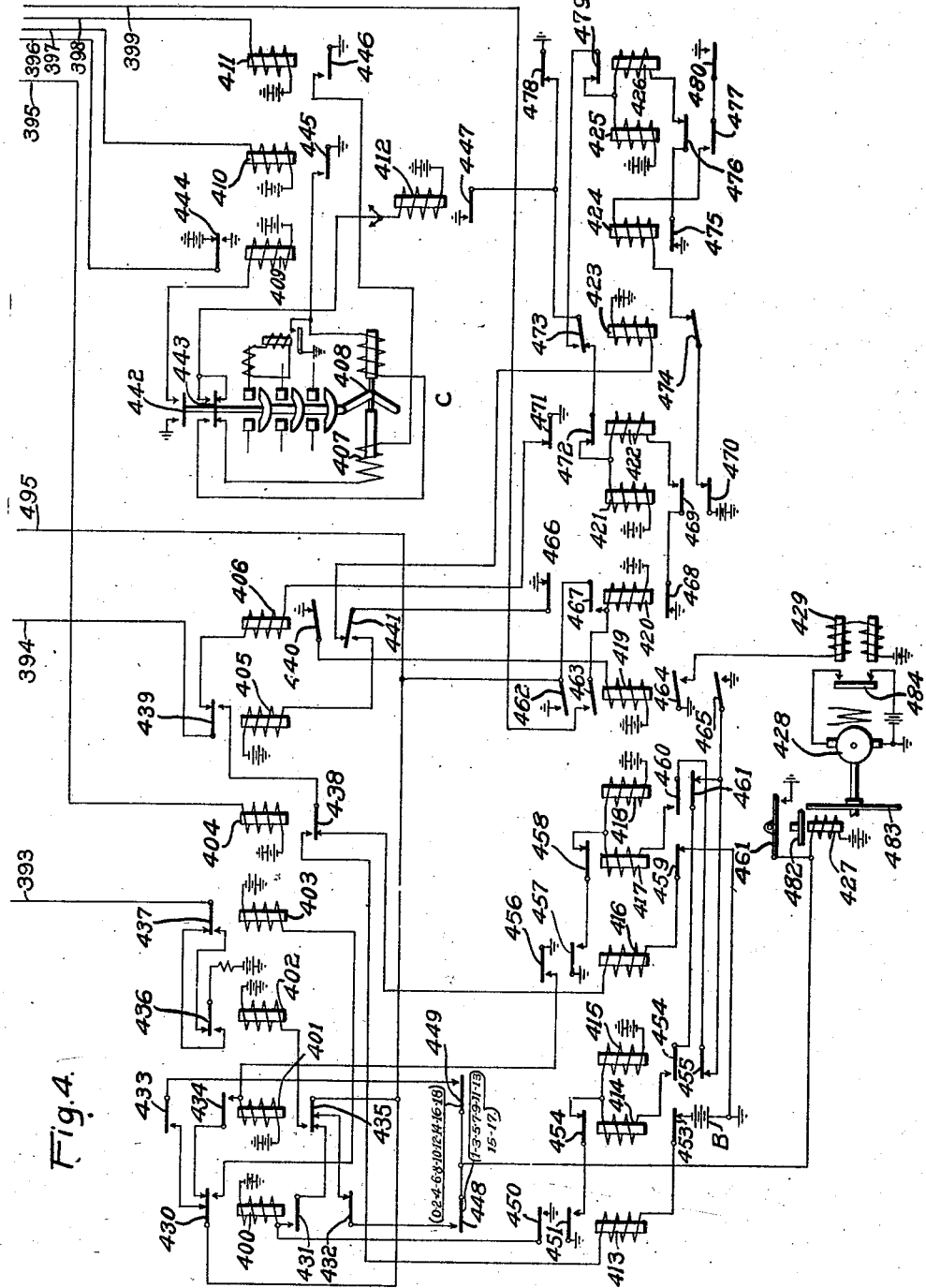

Figs. 1 and 2 show diagrammatically the equipment at the dispatcher's office, while Figs. 3 and 4 show the equipment at the station or the substation.

Briefly, the operation of my invention takes place as follows: When the dispatcher desires to control an apparatus unit at the substation, he will operate a key associated with such unit and then operate a common control key. The operation of the common control key initiates the operation of a control circuit at both the dispatcher's office and the substation to start the movement of the sequence switches. The sequence swiches are operated synchronously throughout their eighteen positions by means of the control circuits.

As the sequence switches rotate, selecting relays at the dispatcher's office and the substation are operated in a predetermined sequence. The operation of the selecting relays serves to select the apparatus units in a definite sequence. When the proper apparatus unit corresponding to the key that is operated is selected, alternating current of a definite frequency is applied to the control signalling circuit, and a mechanically tuned relay at the substation is operated to control the apparatus unit. During this signalling operation, the operation of the synchronous control circuit is prevented.

The operation of the apparatus unit completes a circuit for operating the supervisory signalling devices at the dispatcher's office to indicate the operation of the unit. Responsive to the operation of the supervisory devices, the control circuit again functions to permit the sequence switches to rotate. After the apparatus unit has operated, the equipment is restored to normal.

Referring now more particularly to Fig. 1, relays 100 to 118, inclusive, are ordinary relays of the multi-contact type and will be termed selecting relays. Keys K—3 to K—20, inclusive, are of the usual single-throw locking type and are provided for the purpose of controlling the operation of a control circuit in a manner to be described. Relays 119 to 124, inclusive, are controlling relays for controlling the operation of the control circuit.

In Fig. 2, key K is one of a plurality of keys that is adapted to control the operation of the apparatus units at the substation. The key K is a two-position key. The construction of this key is such that, when the handle 299 is turned, an operating member 291 forces springs 229 and 230 into engagement with their working contacts, that is, in the opposite position shown. When the handle 299 is again turned, the springs 229 and 230 are released into engagement with their resting contacts or into the position shown in the drawings.

A key K—1 is an ordinary key of the single-throw non-locking type and is common to all the keys in the office. Generators 227 and 228 are alternating-current generators for generating alternating currents of predetermined frequencies, namely 16 cycles and 42 cycles, respectively. Relays 200 to 202, inclusive, are associated with the key K.

The relay 200 is of the ordinary type, while the relays 201 and 202 are constructed and positioned with respect to each other so that the armature 236 of the relay 202 is adapted to mechanically maintain the armatures 237 and 238 of the relay 201 in operated position. The relay 201 controls the operation of the supervisory signalling devices 239 and 240. A key, such as K—2, is of the ordinary single-throw non-locking type and is provided for the purpose of checking the operation of the control circuit in a manner to be described. Relays 203 to 223, inclusive, constitute the control circuit at the dispatcher's office.

A magnet 224 is of the ordinary type and is adapted to close the circuit of a motor 225. The motor 225 drives a disc 287. The magnet 226 is a magnet for controlling the operation of the sequence switch cams. The magnet, when energized, brings the disc 289 into engagement with the disc 287, thereby causing the shaft carrying the sequence switch cams to be rotated. When the magnet is released, the rotation of the sequence switch shaft carrying the cams ceases.

The magnet 226 controls the operation of the sequence switch cams 125 to 143, inclusive, in Fig. 1 and cams 253 and 254 of Fig. 2.

In Fig. 3, relays 300 to 318, inclusive, select apparatus units, such as C, at the substation. Relays 319 and 320 are of the pendulum type and are mechanically tuned to respond to predetermined frequencies of alternating current. Relays 321 and 322 control the operation of the apparatus units. Relays 324 to 328, inclusive, control certain portions of the control circuit.

Relays 400 to 406, inclusive, of Fig. 4, and relays 413 to 426, inclusive, constitute the control circuit at the substation. A circuit breaker C is illustrated which is of the usual type and may perform any desired function. Details of the automatic operation of such a breaker are shown in Wolff Patent No. 1,180,751. Relays 409 to 411, inclusive, are associated with the circuit breaker C and control its operation and the sending of supervisory signals.

A relay 412 is a relay common to all the circuit breakers and is of low resistance. A magnet 429 is adapted to close the circuit of a motor 428. The motor 428 rotates a disc 483. A magnet 427 is a sequence switch magnet and is adapted to control the rotation of the sequence switch cams in the usual manner. The cams 330 to 348, inclusive, Fig. 3, and cams 448 and 449, Fig. 4, are controlled by the sequence switch magnet, that is, when the sequence switch magnet is energized, these cams are rotated, while, when the sequence switch magnet is deenergized, the rotation of the cams ceases.

Having described the apparatus shown in the drawings, I will now explain its detailed operation. For this purpose, it will be assumed that the dispatcher desires to operate the circuit breaker C. In order to accomplish this result, the dispatcher will operate a key K to the position shown and will then operate the common control key K—1 twice, the second time maintaining it in operated position.

When the system is normal, a circuit is completed extending from battery by way of armature 263 and its back contact, relay 203, back contact and armature 243, conductor 195, back contact and armature 189, trunk conductor 199, armature 381 and its back contact, conductor 394, armature 439 and its back contact, relay 406 and back contact and armature 471 to ground. The relays 203 and 406 are energized over this circuit.

The relay 203, upon operating, completes a circuit, at armature 241, for the relay 217 and, at armature 242, completes a circuit extending from ground by way of back contact and armature 267, armature 242 and its front contact and relay 213 to battery. The relay 217 is operated to open the locking circuit of the relay 216 at armature 270, to open a point in the original energizing circuit of the relay 216 at armature 271, to open the locking circuit of each of the relays 218 and 219 and 221 and 222 that is energized at armature 273, and at armature 272 to open the circuit of the magnet 224. The magnet 24 is deenergized to open the circuit of the motor 225, which ceases to operate.

The relay 213, upon operating, prepares a circuit at armature 262 for the relay 212, and at armature 261 prepares a circuit for the starting relay 215.

At the substation, the relay 406, upon being operated, completes a circuit at armature 440 for the relay 419, and at armature 441 completes a circuit for the relay 423. The relay 419, upon being energized, opens the locking and the original energizing circuit of the relay 420 at armatures 462 and 463, opens the locking circuit of each of the relays 414 and 415 and 417 and 418 that is energized, at armature 465, and at armature 464 opens the circuit of the magnet 429. The magnet 429 is deenergized to open the circuit of the motor 428, which ceases to operate. The relay 423, upon being energized, prepares a circuit at armature 474 for the relay 424 and at armature 473 prepares a circuit for the starting relay 421.

Now, when the key K—1, at the dispatcher's office, is first operated, a circuit is completed extending from ground by way of working contact of spring 233 and said spring, armature 264 and its back contact, and relay 215 to battery. The relay 215 is energized to prepare a circuit at armature 266 for the relay 212 and to complete a circuit, at armature 265, extending from ground by way of back contact and armature 269, armature 265 and its front contact, relay 214 and relay 215 to battery. The circuit for the relay 214 is not effective as long as the original energizing circuit of the relay 215 is completed.

When the key K—1 is released, the short-circuit is removed from the winding of relay 214 and this relay is operated to open another point in the original energizing circuit of the relay 215 at armature 264, and at armature 263 opens the circuits of the relays 203 and 406. The relay 203, upon being deenergized, opens the circuit of the relay 217 at armature 241, opens the circuit of the relay 213 at armature 242 and at the back contact of this armature completes a circuit for the relay 204. The relay 213, upon being deenergized, opens one point in the circuit of the relay 212 at armature 262, and at armature 261 prepares a restart circuit, including the relay 211.

The relay 217, upon being deenergized, prepares energizing and locking circuits for the relay 216 at armatures 270 and 271, prepares an energizing and locking circuit for the relays 218, 219, 221 and 222 at armature 273, and at armature 272 completes a circuit for the magnet 224. The motor 225 is immediately operated to rotate the disc 287. The relay 204, upon being energized, opens another point in the circuit of the relay 203 at armature 243 and, at the front contact of this armature, prepares a circuit for the line relay 223.

At the station, the relay 406, upon being deenergized, opens the circuit of the relay 419 at armature 440, opens the circuit of the relay 423 at armature 441, and at the back contact of this armature completes a circuit for the relay 405. The relay 423, upon being deenergized, prepares a circuit for the relay 425 at armature 473 and opens the circuit of the relay 424 at armature 474.

Upon being deenergized, the relay 419, at armatures 462 and 463, prepares circuits for the relay 420, prepares locking circuits for the relays 414, 415, 417 and 418 at armature 465, and at armature 464 completes a circuit for the magnet 429. The magnet 429 is energized to attract the armature 484, thereby closing the circuit for the motor 428. The motor 428 is then operated to rotate the disc 483.

The relay 405, upon operating, opens one point in the original energizing circuit of the relay 406 at armature 439, and at the front contact of this armature completes the trunk circuit. The trunk circuit may be traced from ground by way of back contact and armature 459, relay 416, back contact and armature 438, front contact and armature 439, conductor 394, back contact and armature 381, trunk conductor 199, armature 189 and its back contact, conductor 195, armature 243 and its front contact, armature 244 and its back contact, relay 223 and armature 283 and its back contact to battery. The relays 223 and 416 are energized over the above circuit.

The relay 233, upon operating, completes a circuit for the relay 221 at armature 285 and closes a circuit, at armature 284, for the relay 209. The relay 221, upon operating, opens one point in the locking circuits of the relays 218 and 219 at armature 281, and at armature 280 completes a circuit extending from ground by way of back contact and armature 273, back contact and armature 275, armature 280 and its front contact, relay 222 and relay 221 to battery. This circuit is not effective as long as the original energizing circuit of the relay 222 is completed.

The relay 209, upon being energized, establishes a locking circuit for itself at armature 251 over armature 249 and its back contact, armature 270 and its back contact to ground, removes ground at armature 270 from the contact that is adapted to be closed by the sequence switch cam 253 at armature 250 over 247, at this same armature opens the locking circuit of the relay 208, and at the front contact of this armature completes a circuit for the relay 206. The relay 206, upon being operated, completes a circuit extending from battery by way of armature 246 and its front contact, front contact and armature 245, conductor 196, relay 124 and back contact and armature 187 to ground.

Another result of the operation of the relay 209 is that a circuit is completed extending from ground by way of the back contact and armature 270, armature 249 and its back contact, front contact and armature 252, sequence switch contacts 254 that are closed in zero position and sequence switch magnet 226 to battery. The sequence switch magnet is operated to cause the sequence switch to be moved to position 1. The cam 288 operates as a centering cam to center the sequence switch in position 1.

The relay 124 is operated over the above circuit. Upon operating, the relay 124, at armature 189, opens the circuit of the line relay 223 and, at armature 188, prepares a circuit for the relay 123. The line relay 223 is now deenergized and operates to open the original energizing circuit of the relay 209 at armature 284 and removes the short-circuit from the winding of relay 222 at armature 285. The relay 222 is immediately energized to open another point in the original energizing circuit of the relay 221 and to disconnect battery from one terminal of the line relay 223.

With the sequence switch in position 1, the selecting relay 101 is energized. The selecting relay 101, upon being energized, prepares certain controlling circuits and, in addition, completes a circuit extending from ground by way of working contact of spring 145 and said spring and relay 119 to battery. The relay 119 is energized over this circuit and operates to establish a locking circuit to be traced later for itself at armature 176, to open one point in the locking circuit of the relay 120 at armature 177 and to complete a circuit at armature 178 extending from ground by way of back contact and armature 181, front contact and armature 178, conductor 194 and winding of relay 205 to battery. The previously mentioned locking circuit for the relay 119 extends to ground over the conductor 292 and armature 270 and its back contact. The relay 205, upon being energized, prepares a circuit for the line relay 220 at armature 244.

At the substation, the relay 416, upon being energized, completes a circuit for the relay 418 at armature 457 and completes a circuit for the relay 401 at armature 456. The relay 418 operates to open the locking circuit of the relays 415 and 416 at armature 461, and to complete a circuit extending from ground by way of back contact and armature 465, back contact and armature 455, armature 460 and its front contact and relays 417 and 418 to battery. The relay 417 is not energized until the original energizing circuit of the relay 418 is opened.

The relay 401, upon being operated, disconnects ground at 462 from the contacts controlled by the sequence switch cam 448 at armature 435, at this same armature opens one point in the locking circuit of the relay 400 and at the front contact of this armature completes a circuit for the relay 402 over a path extending from ground by way of back contact and armature 462, armature 435 and its front contact and relay 402 to battery. The relay 402, upon being operated, completes a circuit extending from battery by way of armature 436 and its front contact, back contact and armature 437, conductor 393, relay 323 and back contact and armature 382 to ground.

Another result of the operation of the relay 401 is that a circuit is completed extending from ground by way of back contact and armature 462, armature 430 and its back contact, front contact and armature 433, sequence switch contact 449 and sequence switch magnet 427 to battery. The sequence switch magnet 427 is operated to drive the sequence switch to position 1. The cam 461 operates as a centering cam. The sequence switch comes to rest in position 1.

The relay 323, upon being energized, opens one point in the circuit of the relay 416 at armature 381, and at armature 380 prepares a circuit for the relay 324. When the circuit of the line relay 416 is opened, this relay is deenergized to open the original energizing circuit of the relay 401 at armature 456 and to remove the short-circuit from the relay 417. The relay 417 is immediately operated to open another point in the original energizing circuit of the relay 418 at armature 458 and to disconnect ground from the winding of relay 416 at armature 459.

With the sequence switch in position 1, the sequence switch contacts 338 are closed and the selecting relay 308 is energized. The relay 308 operates to prepare signalling circuits at springs 362, 363 and 364 and at spring 365 completes a circuit for the relay 328. The relay 328 is operated to establish a locking circuit to be traced later for itself at armature 390, to open the locking circuit of the relay 327 at armature 391 and to complete a circuit extending from ground by way of back contact and armature 389, front contact and armature 392, conductor 395 and winding of relay 404 to battery. The previously mentioned circuit for the relay 328 extends from ground by way of back contact and armature 462, conductor 495, back contact and armature 387, armature 390 and its front contact, and relay 328 to battery. The relay 404, upon being energized, disconnects the line relay 416 and prepares a circuit for the line relay 413.

Another result of the operation of the selecting relay 308 is that, at spring 367, a circuit is completed extending from ground by way of working contact and said spring and relay 326 to battery. The relay 326 is operated over the above circuit to complete a circuit extending from ground by way of front contact and armature 380, armature 385 and its front contact, back contact and armature 383, winding of relay 324, armature 384 and its back contact and front contact and armature 386 to battery. The relay 324 is energized over the above circuit and operates to establish a locking circuit for itself at armature 382 and to open the energizing circuit of the relay 323. The relay 323 is deenergized to open one point in the original energizing circuit of the relay 324 at armature 380 and at armature 381 to reestablish one point in the trunk circuit.

As the selecting relays 101 and 308 are now energized, and the key K—1 is depressed, there is a circuit completed extending from the ungrounded brush of the alternating-current generator 227, that generates an alternating current of 16 cycles, by way of spring 231 and its working contact, resting contact of spring 229 and said spring, conductor 191, spring 148 and its working contact, trunk conductor 198, and relays 319 and 320 in parallel to ground. As the relay 319 is the one that is tuned to this particular frequency of current, it will respond to complete a circuit for the relay 322. The relay 322 is sufficiently slow acting to main its armature attracted during the momentary interruptions of its circuit by reason of the vibration of the armature 376.

The relay 322, upon being energized, completes a circuit extending from ground by way of front contact and armature 379, working contact of spring 364 and said spring, conductor 398 and relay 411 to battery. The relay 411 is energized to complete a circuit for the closing coil 407 of the circuit breaker C in series with the common relay 412 at armature 446. The closing coil 407 operates to close the circuit breaker C. This operation may perform any desired function at the station.

The relay 412 is energized momentarily in the circuit of the closing coil 407. The relay 412 operates to complete a circuit extending from ground by way of front contact and armature 447, armature 473 and its back contact, armature 479 and its back contact, and winding of relay 425 to battery. The relay 425 is operated to complete a circuit for the relay 426. This circuit is not effective as long as the original energizing circuit of the relay 425 is closed.

Another result of the operation of the relay 425 is that a circuit is prepared for the relay 424. When the relay 412 is deenergized, by the operation of the circuit breaker C, the short-circuit is removed from the winding of the relay 426 and this relay is energized in series with relay 425. The relay 426 operates to prepare a point in the circuit of the relay 424 at armature 480, and to prepare a circuit at armature 478 for the starting relay 421.

As a result of the operation of the circuit breaker C, the relay 409 is energized. The relay 409, upon being operated, completes a circuit extending from ground by way of front contact and armature 444, conductor 396, spring 362 and its working contact, trunk conductor 197, working contact of spring 147 and said spring, conductor 192, armature 235 and its back contact, and relay 202 to battery.

The relay 202 is energized over the above circuit and operates to attract its armature 236, thereby permitting the armatures 237 and 238 on the relay 201 to be retracted. As a result of the retraction of the armature 238, the supervisory lamp 240 is deenergized and the lamp 239 is lighted. By this change in supervisory signals, the dispatcher is informed that the apparatus unit at the substation has been operated.

The operation of the armature 237 completes a circuit for the relay 200. The relay 200 operates to connect the relay 201 to the signalling circuit at armature 235, to disconnect the relay 202 at the back contact of this armature, and at armature 234 to complete a circuit extending from ground by way of front contact and said armature, resting contact of spring 230 and said spring, conductor 190, normally closed springs of key K—3, working contact of spring 146 and said spring and relay 121 to battery. The relay 121 is operated to attract its armatures 182 and 184, thereby completing a circuit extending from ground by way of front contact and armature 188, armature 182 and its front contact, back contact and armature 185, relay 123, armature 186 and its back contact, and front contact and armature 184 to battery. The relay 123 is energized over this circuit and operates to open the circuit of the relay 124 at armature 187 and to establish a locking circuit for itself at the front contact of this armature.

The relay 124 is deenergized to open the original energizing circuit of the relay 123 and to complete a circuit extending from ground by way of back contact and armature 277, winding of line relay 220, front contact and armature 244, front contact and armature 243, conductor 195, back contact and armature 189, trunk conductor 199, armature 381 and its back contact, conductor 394, armature 439 and its front contact, armature 438 and its front contact, relay 413 and armature 453 and its back contact to battery. The line relays 220 and 413 are energized over this circuit.

The line relay 220, upon being energized, completes a circuit for the relay 208 at armature 278, and completes a circuit at armature 279 for the relay 218. The relay 218, upon being energized, opens the locking circuit of the relays 221 and 222 at armature 275, and at armature 274 prepares a circuit for the relay 219. The relay 222, upon being deenergized, prepares a circuit for the relay 221 at armature 282, and at armature 283 prepares a circuit for the relay 223. The relay 221, upon being deenergized, opens another point in the circuit of the relay 222 at armature 280, and at armature 281 completes a circuit extending from ground by way of back contact and armature 273, back contact and armature 281, armature 274 and its front contact, relay 219 and relay 218 to battery. This circuit is not effective until the original energizing circuit of the relay 218 is opened.

The relay 208, upon being energized, removes ground from the sequence switch contact 254 at armature 249, at this same armature opens the locking circuit of the relay 209, completes a circuit for the relay 207 at the front contact of this armature, prepares a locking circuit for itself at armature 248 and prepares a circuit for the sequence switch magnet 226 at armature 247. The relay 209, upon being deenergized, opens another point in its locking circuit at armature 251, and at armature 250 opens the circuit of the relay 206, establishes a locking circuit for the relay 208 and also completes a circuit extending from ground by way of back contact and armature 270, armature 250 and its back contact, front contact and armature 247, sequence switch contact 253 in position 1 and sequence switch magnet 226 to battery. The relay 206 is deenergized to prepare a circuit for the relay 124.

The movement of the sequence switch causes the circuit of the selecting relay 101 to be opened at springs 126 and this relay is deenergized to open the circuit of the relay 121 at spring 146 and to open the original energizing circuit of the relay 119 at spring 145. The relay 121, upon being deenergized, opens the circuit of the relay 123 which is also deenergized. The deenergization of the latter relay prepares a point in the circuit of the relay 124.

The sequence switch magnet 226 is now energized to cause the sequence switch to be rotated into position 2 where its circuit is opened at spring 253. The relay 207, upon being energized, completes a circuit extending from battery by way of armature 246 and its front contact, back contact and armature 245, conductor 196, winding of relay 124 and back contact and armature 187 to ground.

The relay 124, upon being energized, prepares one point in the circuit of the relay 123 at armature 188 and at armature 189 opens the circuit of the line relay 220. The relay 220 is deenergized to open one point in the circuit of the relay 208 at armature 278 and to remove the short-circuit from the winding of the relay 219. The relay 219 is immediately operated to open another point in the circuit of the line relay 220 at armature 277 and to open another point in the original energizing circuit of the relay 218 at armature 276.

The movement of the sequence switch into position 2 causes the energization of the selecting relay 102. By the operation of the selecting relay 102, certain selecting circuits are prepared. Another result of the operation of the relay 102 is that a circuit is completed at spring 149 and its working contact for the relay 120. The relay 120 is operated to open the locking circuit of the relay 119 at armature 179, to prepare a locking circuit for itself at armature 180, and to open the circuit of the relay 205 at armature 181. The relay 119 is deenergized to complete a locking circuit for the relay 120. The relay 205, upon being deenergized, prepares a circuit for the line relay 223 at armature 244.

Inasmuch as the conductor 172 extending to the spring 174 is connected by way of springs of the key K—4 to a key similar to key K and the position of this key is not changed, there will be ground present upon the conductor 172. The manner in which this ground extends to conductor 172 may be seen by referring to the connections of the conductor 171 with the key K.

A circuit is now completed extending from ground by way of working contact of spring 174 and said spring, and relay 122 to battery. The relay 122 is energized to complete a circuit, at armatures 185 and 186, extending from ground by way of front contact and armature 188, armature 182 and its back contact, front contact and armature 185, relay 123, armature 186 and its front contact and back contact and armature 184 to battery. The relay 123 is operated to open the circuit of the relay 124 at armature 187, and to establish a locking circuit for itself at the front contact of this armature. The relay 124 is deenergized to complete one point in the circuit of the line relay 223 at armature 189, and to open one point in the original energizing circuit of the relay 123.

At the substation, the relay 413, upon being energized, completes a circuit for the relay 415 at armature 451 and completes a circuit for the relay 400 at armature 450. The relay 415, upon being energized, open the circuit of the relays 417 and 418 at armature 455 and at armature 454 prepares a circuit for the relay 414. The relay 417, upon being deenergized, prepares a circuit for the relay 418 at armature 458, and at armature 459 prepares a circuit for the relay 416. The relay 418, upon being deenergized, completes a circuit extending from ground by way of back contact and armature 465, back contact and armature 461, armature 454 and its front contact, relay 414 and relay 415 to battery. The above circuit is not effective until the original energizing circuit of the relay 415 is opened.

The relay 400, upon being energized, opens the locking circuit of the relay 401 at armature 430, at the front contact of this armature completes a circuit for the relay 403, prepares a locking circuit for itself at armature 431, and prepares a circuit for the sequence switch magnet 427 at armature 432. The relay 401, upon being deenergized, opens the circuit of the relay 402 at armature 435, completes a locking circuit for the relay 400 and also completes a circuit extending from ground by way of back contact and armature 462, armature 435 and its back contact, front contact and armature 432, sequence switch contact 448, and sequence switch magnet 427 to battery.

When the sequence switch magnet 427 is operated to move the sequence switch from position 1 to position 2, whereupon its own circuit is opened, the relay 402 is deenergized to prepare one point in the circuit of the relay 323. Another result of the movement of the sequence switch is that the selecting relay 308 is deenergized and the original energizing circuit of the relay 328 is opened, as is also the circuit of the relay 326 at springs 367 and 365.

The relay 326, upon being deenergized, opens the circuit of the relay 324 and this relay is deenergized to prepare a circuit for the relay 323. The relay 403, upon being energized, establishes a circuit extending from battery by way of armature 436 and its front contact, front contact and armature 437, conductor 393, relay 323 and front contact and armature 382 to ground. The relay 323 is operated over the above circuit and operates to prepare a circuit for the relay 324 at armature 380 and to open the circuit of the line relay 413 at armature 381. The relay 413 is deenergized to remove the short-circuit from the relay 414. The relay 414 is operated to open one point in the circuit of the relay 415 and to disconnect battery from one terminal of the winding of relay 413.

In position 2 of the sequence switch, the spring 337 is caused to close a circuit for the selecting relay 307. The selecting relay 307 is operated to complete certain selecting circuits and also complete a circuit at working contact of spring 371 and said spring, and relay 327 to battery. The relay 327 is operated to open the locking circuit of the relay 328 and to open the circuit of the relay 404. The relay 404 is deenergized to prepare a circuit for the line relay 416.

The operation of the spring 361 of the selecting relay 307 completes a circuit extending from ground by way of working contact and said spring and winding of relay 325 to battery. The relay 325 is energized to complete a circuit extending from ground by way of front contact and armature 380, armature 385 and its back contact, front contact and armature 383, relay 324, armature 384 and its front contact and back contact and armature 386 to battery. The relay 324 is operated to open the circuit of the relay 323 at armature 382 and to establish a locking circuit for itself at the front contact of this armature. The relay 323 is deenergized to open one point in the circuit of the relay 324 and to reestablish the trunk circuit at armature 381.

With the selecting relays 102 and 307 energized, battery or ground, as the case may be, is sent over the signalling conductor 197, in accordance with the position of the apparatus unit accessible to the selecting relay 307. If the supervisory signals are in the proper position, at the dispatcher's office, this operation will have no effect. However, if the supervisory signals do not correspond to the position of the apparatus units, they will be operated to indicate such operation in a manner previously described.

The line relays 223 and 416 are now energized over the trunk circuit. The subsequent selecting operations take place in substantially the same manner as before described and will be but briefly outlined.

The line relays 220 and 223, at the dispatcher's office, are energized alternately, as are the line relays 413 and 416 at the substation. The operation of the line relays 220 and 223 controls the operation of the relays 218 and 219 and 221 and 222 to reverse their connections with respect to the trunk or synchronizing conductor 199.

In a like manner, at the substation, the alternate operation of the relays 414 and 415 and 417 and 418 serve to reverse the connection of the line relays, thus insuring that the proper preparatory circuits must be completed before the line relays are energized, inasmuch as the line relays are energized in series, and, unless the proper preparatory circuits have been completed, no energization of the line relays takes place.

The line relays 220 and 223, at the dispatcher's office, control the operation of the relays 208 and 209 and these relays are alternately operated to cause the sequence switch magnet to be successively energized to drive the sequence switch around through eighteen positions and into zero position. Unless the relays 208 and 209 are alternately energized, there is no circuit completed for the sequence switch magnet and the operation of this magnet ceases.

At the substation, the line relays 413 and 415 control the operation of the relays 400 and 401. The alternate operation of the relays 400 and 401 causes the successive energizations of the sequence switch magnet 427 to drive the sequence switch through all its positions, which number eighteen, into zero position. Unless the relays 400 and 401 are energized alternately, there is no circuit completed for the sequence switch magnet 427 and the sequence switch magnet is not operated. Of course, inasmuch as the sequence switch magnet is not operated, the preparatory circuits for controlling the line relays are not completed and the operation stops at this point.

At the dispatcher's office, as the sequence switch moves from position 2 to position 18, the selecting relays 103 to 118, inclusive, are energized in numerical sequence by the operation of the sequence switch contacts 128 to 143, inclusive. The operation of the selecting relays, of course, prepares selecting circuits which are operative in the event that a key, such as K, has been operated to a new position since otherwise the apparatus will be in corresponding position and the signals will have no operating effect. The operation of these relays also causes the alternate operation of the relays 121 and 122 and 120 and 119. Unless the relays 120 and 119 are energized, alternately, the switching relay 205 is not operated to connect the proper line relay 220 or 223 into the control circuit. Unless the relays 121 and 122 are energized in the proper sequence, the relay 124 is not released at the proper time to complete the control circuit.

At the substation, the operation of the sequence switch from position 2 through position 18 to position zero causes the successive energization of the selecting relays 307, 306, 305, 304, 303, 302, 301 and 300 and 318, 317, 316, 315, 314, 313, 312, 311 and 310 in the order mentioned by the operation of the sequence switch contacts 337, 336, 335, 334, 332, 331 and 330 and 348, 347, 346, 345, 344, 343, 342, 341 and 340.

The operation of the selecting relays, in addition to completing selecting circuits, is to cause the alternate operation of the relays 328 and 327 and the relays 325 and 326. The operations of the relays 328 and 327 cause the relay 404 to be energized or deenergized at the proper time to connect the proper line relay 413 or 416 into the line circuit. The relays 325 and 326 control the operation of the relay 323 which completes the line or trunk circuit.

During the operation of the successive selecting relays, which occurs simultaneously in the same sequence at both the dispatcher's office and substation, signalling circuits are prepared which are effective in the event that an apparatus unit has operated, that is, in the event that the signalling devices at the dispatcher's office do not correspond with the position of the apparatus unit or in the event that the dispatcher has operated a key, such as K, in the manner described. The signalling operations and the control operations during this time take place in substantially the same manner as before described.

Attention is drawn to the fact that, when the dispatcher desires to control an apparatus unit, the sequence switches at both the substation and dispatcher's office will be stopped with the corresponding selecting relay energized to connect the proper apparatus unit into the signalling circuit and this connection will be maintained until the apparatus unit has operated and an answer-back signal indicative of its condition has been returned to the dispatcher's office.

At the dispatcher's office, when the sequence switch is in position 18, the contacts 143 of the sequence switch are closed, as are the contacts 254. The engagement of the contacts 143 causes the energization of the selecting relay 118. The selecting relay 118 causes the operation of the relay 120 and also the energization of the relay 122. The relay 120 is operated to open the locking circuit of the relay 119 at armature 179, to place ground upon the sequence switch contacts 125 at armature 161, to prepare a locking circuit for itself at armature 180 and to open the circuit of the relay 205 at armature 181. The relay 205 is operated to prepare a circuit for the line relay 223. The relay 122 is energized to complete a circuit for the relay 123. The relay 123, upon operating, opens the circuit of the relay 124, thereby permitting this relay to deenergize. The deenergizing of the relay 124 prepares a circuit for the line relay 223.

At the substation, when the sequence switch is in position 18, the contacts 340 and 449 are closed. The closure of the contact 348 causes the energization of the selecting relay 310. The selecting relay 310, in addition to preparing certain signalling circuits, causes the energization of the relays 327 and 325. The operation of the relay 327 connects ground to the sequence switch contacts 339 at armature 370, opens the locking circuit of the relay 328 at armature 387, prepares a locking circuit for itself at armature 388 and opens the circuit of the relay 404 at armature 389. The relay 328 is deenergized to complete the locking circuit of the relay 327. The relay 404 is deenergized to prepare a circuit for the relay 416. The operation of the relay 325 causes the energization of the relay 324, and it operates to open the circuit of the relay 323, which relay is deenergized to complete the trunk circuit.

The line relays 223 and 416 are now energized. The relay 223, upon operating, causes the energization of the relay 221 and also the operation of the relay 209. The relay 209 is energized to open the locking circuit of the relay 208 and to drive the sequence switch from position 18 into zero position. The movement of the sequence switch stops in zero position.

By the movement of the sequence switch, the sequence switch contacts 143 are opened and the selecting relay 118 is deenergized, as is the relay 122. The deenergization of the relay 122 opens the circuit of the relay 123, thus permitting this relay to deenergize to complete a circuit for the relay 124. The relay 124 is operated to open one point in the trunk circuit.

The movement of the sequence switch into zero position causes the operation of the selecting relay 100. The selecting relay 100 is energized to place ground upon the conductor 193. The grounding of conductor 193 brings about the operation of the relay 216. The relay 216 is energized to open the circuit of the relays 214 and 215 at armature 269, to open the circuit of the relay 204 at armature 267, and to establish a locking circuit for itself at armature 268. The relays 214 and 215 are immediately deenergized. The deenergization of the relay 214 prepares a circuit for the relay 203.

Another result of the operation of the selecting relay 100 is that a circuit is completed for the relay 121. This circuit is completed over 143, K—2, its line equivalent to 190 (not shown) to ground. The relay 121 is operated to complete a circuit for the relay 123. The relay 123 attracts its armature to open the circuit of the relay 124 and this relay is deenergized to prepare another point in the circuit of the relay 123.

At the substation, the operation of the line relay 416 causes the operation of the relay 418 and also the operation of the relay 401. The relay 401 is operated to open the locking circuit of the relay 400 and to complete a circuit for the sequence switch magnet 427, whereby the sequence switch is moved from position 18 to zero position.

The movement of the sequence switch causes the release of the relay 310 which operates to open the circuit of the relay 325. The relay 325 is deenergized to de-energize 324, thereby completing the circuit for the relay 323 as already described. The relay 323 operates to open one point in the trunk circuit.

The movement of the sequence switch into zero position causes the energization of the relay 309 by reason of the fact that the relay 318, upon energizing, also completes a circuit for the relay 327 and places ground from 370 upon the sequence switch contacts 339. The relay 327 also opens the locking circuit of the relay 328 and the circuit of the relay 404. Another result of the operation of the relay 309 is that a circuit is completed extending from ground over conductor 399 by way of back contact and armature 463 and relay 420 to battery.

The relay 420 is operated to establish a locking circuit for itself and to open the circuit of the relay 405. The relay 405 is deenergized to prepare a circuit for the relay 406. Another result of the operation of the relay 420 is that the circuits of the relays 421 and 422 are opened. The relay 422 is deenergized to prepare another point in the circuit of the relay 406.

Another result of the operation of the relay 309 is that a circuit is completed for the relay 326. This circuit is completed over 368 to ground at 309. The relay 326 is operated to complete a circuit for the relay 324. The relay 324 is operated to cause the deenergization of the relay 323. The relay 323 is deenergized to complete the trunk circuit.

A circuit is now completed extending from battery by way of armature 263 and its back contact, winding of relay 203, back contact and armature 243, conductor 195, back contact and armature 189, trunk conductor 199, armature 381 and its back contact, conductor 394, armature 439 and its back contact, relay 406 and armature 471 and its back contact to ground. The relays 203 and 406 are energized over the above circuit.

The relay 203, upon being operated, prepares a circuit for the relay 213 at armature 242 and completes a circuit, at armature 241, for the relay 217. The relay 217, upon being operated, opens the locking circuit of the relay 216 at armature 270, opens the original energizing circuit of this relay at armature 271, at armature 272 opens the circuit of the magnet 224 and at the armature 273 opens the locking circuits of the relays 221 and 222. By the deenergization of the relay 224, the circuit of the motor 225 is opened and the motor ceases to operate. By the deenergization of the relay 216, a circuit is prepared for the relay 214 and a circuit is now closed for the relay 213. The deenergization of the relays 221 and 222 prepares certain points in the line circuit.

Another result of the operation of the relay 217 is that the locking circuit of the relay 209 is opened at armature 270 and ground is removed from the conductor 292 at this same armature. The relay 209 is deenergized to restore certain circuits to normal. The removal of ground from conductor 292 opens the circuit of the relay 120 and this relay is deenergized to remove ground from the sequence switch contacts 125 and to prepare certain other circuits. The removal of ground from the sequence switch contacts causes the release of the relay 100 and the deenergization of the relay 121. The relay 121 is deenergized to open the circuit of the relay 123, which is also deenergized. The relay 213 when operated prepares a circuit for the relay 215 and also for the relay 212.

In the above manner, the apparatus at the dispatcher's office is restored to normal, responsive to the completion of the sending operation.

At the substation, the relay 406, upon being operated, prepares a circuit for the relay 423 and completes a circuit for the relay 419. The relay 419 is operated to open the locking circuit of the relay 401 at armature 462, to remove ground from the conductor 495 at this same armature, to open the circuit of the relay 420 at armature 463, to open the circuit of the magnet 429 at armature 464 and to open the locking circuits of the relays 417 and 418 at armature 465. The relays 417 and 418 are deenergized to prepare certain points in the line circuit. The magnet 429 is deenergized to stop the rotation of the motor 428. The relay 420 is deenergized to complete a circuit for the relay 423 and to prepare a circuit for the relay 422. The relay 401 is deenergized to open the circuit of the relay 402 and to restore certain other circuits to normal. The relay 402 is deenergized to open one point in the circuit of the relay 323.

The removal of ground from conductor 495 opens the circuit of the relay 327 which is deenergized to remove ground from the sequence switch contacts 339 at armature 370 and to restore certain other circuits to normal at its other armatures. The removal of ground from the sequence switch contacts 339 brings about the deenergization of the relay 309.

As a result of the deenergization of the relay 309, the original energizing circuit of the relay 420 is opened and also the circuit of the relay 326. The relay 326 is deenergized to open the circuit of the relay 324 and this relay retracts its armature to prepare a circuit for the relay 323. The relay 423 operates to prepare a circuit for the relay 424 and to prepare a circuit for the relay 421. This action completes the restoring operation of the apparatus at the substation.

However, it will be remembered that the relay 426 is locked energized, and, as a result of this operation, a circuit is completed for the relay 421 from ground, battery, relay 421, armatures 472 and 473 and 478 to ground. The relay 421 is operated to complete a circuit for the relay 422 and also to complete a circuit extending from battery by way of armature 470 and its front contact, armature 474 and its front contact, relay 424, front contact and armature 477 and armature 480 and its front contact to ground. The relay 424 is energized to open the circuit of the relays 425 and 426. These relays are deenergized to open the circuit of the relay 424, which is also deenergized. The deenergization of the relay 426 also removes the short-circuit from the relay 422 and this relay is energized to open the circuits of the relays 406 and 203 at the substation and dispatcher's office, respectively. The apparatus now functions and is released in the same manner as before described.

During the second cycle of the apparatus, the operation of all the signalling devices at the dispatcher's office is checked. The reason that this circuit operation is brought about is to make sure that the dispatcher's signals are correct after the operation of an apparatus unit.

In the event that an apparatus unit at the substation operates under automatic control, the operation proceeds in a manner somewhat similar to that described. To explain this operation, it will be assumed that the circuit breaker C is operated by automatic devices. The operation of the circuit breaker completes a momentary circuit for the relay 412 and, assuming that the selective equipment is normal, brings about the operation of the relays 421 and 422. The energization of the relay 422 initiates the operation of the selecting apparatus in the same manner as before described.

In the event that the selective equipment is functioning when an apparatus unit is operated automatically, the relay 426 is energized in substantially the same manner as before and, when the selective equipment restores to normal, the relay 422 is again energized, as described, and brings about the reoperation of the selective apparatus.

In the event that the dispatcher desires to open the circuit breaker C when it is in closed position, the operation proceeds in the same manner as before described, except that alternating current from the alternating-current generator 228 is applied to the signalling circuit and the mechanically tuned relay 320 is energized to bring about the operation of the relay 410 which closes a circuit for the tripping coil 408 at the circuit breaker C. By this action, the circuit breaker is tripped and battery is applied to the signalling conductor 197 to energize the relay 201. The relay 201 attracts its armatures 237 and 238 to change the supervisory signals. These armatures are now locked in this position by reason of the fact that the relay 202 is deenergized. The energization of the relay 201 also permits the control circuit to function by the grounding of conductor 171 at armature 237.

It is sometimes desirable for the dispatcher to be able to check the operation of the selective apparatus or the condition of his supervisory signalling devices. In order to accomplish this result, a checking key K—2 is provided. In the event that the equipment is normal when this checking key is momentarily operated, the relays 214 and 215 are energized to bring about the operation of the selective apparatus in the same manner as before described. However, should the equipment be operating at the same time this key is momentarily operated, a circuit will be completed for the relay 211 by the de-energization of relay 203 and 213, as already explained. The relay 211 operates to complete a circuit for the relay 210 and to prepare a circuit for the relay 212 at armatures 258 and 259, respectively.

When the key K—2 is released, the relay 210 is energized to prepare another point in the circuit of the relay 212 and to prepare a circuit for energizing the relay 215 when the relay 213 is energized at the time the selective apparatus is restored to normal. When the relay 213 is energized, the relay 215 is operated to complete a circuit for the relay 212. The relay 212 operates to open the circuit of the relays 210 and 211 and these relays are deenergized. By the deenergization of the relay 210, the short-circuit is removed from the winding of the relay 214 and this relay operates to open one point in the trunk circuit. The subsequent operation of the selective equipment takes place in the same manner as before described.

It is sometimes desirable for the dispatcher to be able to extend a connection to a predetermined apparatus unit and remain connected thereto as long as he desires, in order to observe the functioning of the apparatus unit and the operation of the supervisory signals indicating such operation. To accomplish this result, keys, such as K—3, K—4 and K—5, are provided at the dispatcher's office for each apparatus unit that it is desired to connect with. To connect with one of these apparatus units, it is only necessary for the dispatcher to open a key, such as K—3.

It will be remembered that, unless there is ground present upon the conductor 171, the relay 121 is not energized and the relay 124 remains operated to maintain the control circuit open. With the selecting relay 101 at the dispatcher's office energized, the selecting relay 308 at the substation is operated. A control circuit now extends from the dispatcher's office to the mechanically tuned relays 319 and 320 and from the relays 322 and 321, under the control of these mechanically tuned relays, to the relays 411 and 410 that control the operation of the circuit breaker C. Also a signalling circuit extends from armature 444 of the relay 409 to the signalling relays associated with the key K.

It will be seen that this connection will be maintained until the dispatcher restores the key K—3, to normal. It will also be seen that the dispatcher may control the apparatus unit in any manner that he desires by operating the key K and the control key K—1. The supervisory indications will be returned in each case, indicative of the operation of the circuit breaker C. When the key K—3 is restored to normal, the control circuit is again permitted to function and the subsequent operations take place in substantially the same manner as before described.

My invention is not limited to the particular arrangement of the apparatus illustrated, but may be variously modified without departing from the spirit and scope of my invention, as set forth in the appended claims.

I claim as my invention:

1. In an electrical system, a first station, a second station, rotating devices at each station, selector relays at each station, equal in number, means including circuit arrangements, whereby said rotating devices at either station control the selector relays thereat, and means including circuit arrangements whereby said selector relays in turn, jointly with the selector relays at the distant station, control the rotating device thereat, whereby synchronism of said devices is maintained.

2. In an electrical system, a first station, a second station, a rotating device at each station, a chain of relays at each station, means controlled by said devices for operating said relays at each station sequentially and in synchronism with the relays at the remote station, and means including circuit arrangements whereby the rotation of the device at one station is controlled by the sequential operation of the relays at the distant station.

3. In a supervisory control system, a first station, a second station, a chain of relays at said first and said second stations, a rotating switch at each of said stations provided with contacts angularly displaced from each other and individual to each of said selecting relays, means including circuits for energizing said relays sequentially as said switch rotates and means responsive to the energization of said relays for rotating said switches.

4. In a supervisory control system, a first station, a second station, a chain of relays at said first station, a rotating switch, means including circuits for energizing said relays sequentially as said switch rotates, a chain of relays at said second station, a switch thereat, means including circuits connected to said switch and said relays for energizing said relays at said second station sequentially as said switch rotates and means including said relays for rotating said switches as said relays energize.

5. In a supervisory control system, a first station, a second station, a chain of relays at said first and said second station, a switch at said first and said second station, means including circuits connecting said switches and said relays for sequentially energizing said relays as said switches rotate and means responsive to the energization of said relays for rotating said switches.

6. In a supervisory control system, a first station, a second station, a chain of relays at said first station and said second station, a switch individual to each of said chains of relays, means including circuit connections between said switches and said relays for rotating said switches, means responsive to the rotation of said switches in synchronism for energizing said relays in synchronism and means responsive to the synchronous energization of said relays for maintaining said switches in synchronism.

7. In a supervisory control system, a first station, a second station, apparatus units at said second station, signaling devices individual thereto at said first station, a chain of relays at each of said stations, a switch at each of said stations means for operating said switches in synchronism, means responsive to the synchronous operation of said switches for energizing said relays in synchronism, means including said relays energized in synchronism for selectively operating said apparatus units at said station and means including said relays energized in synchronism for operating said signalling devices individual to said apparatus units responsive to the operation of said apparatus units.

8. In a supervisory control system, a first station, a second station, apparatus units at said second station, signalling devices individual thereto at said first station, a chain of relays at each of said stations, a switch at each of said stations means for operating said switches in synchronism, means responsive to the synchronous operation of said switches for operating said relays in synchronism, means responsive to the synchronous operation of said relays for operating said switches, means including said relays operating in synchronism for selectively operating said apparatus units from said first station, and means including said relays energized in synchronism for selectively operating said signalling devices responsive to the operation of said apparatus units.

9. In a supervisory control system, a first station, a second station, automatically operable apparatus units at said second station, a signalling device at said first station individual to each of said apparatus units for indicating the position of each of said apparatus units, synchronously operating means at said first and said second station for consecutively associating each of said apparatus units with its signalling device and means whereby if any one of said signalling devices does not agree with the position of its individual apparatus unit, said synchronous device is stopped when said signalling device is reached until said signalling device correctly indicates the condition of said unit.

10. In a supervisory control system, a first station, a second station, apparatus units at said second station operable to a plurality of positions, signalling devices individual thereto at said first station for indicating the positions of said units, synchronous means for consecutively associating each of said apparatus units with its signalling devices and means whereby said synchronous devices are automatically stopped when the signalling device which does not agree with the conditions of its apparatus unit is reached.

11. In a supervisory control system, a first station, a second station, apparatus units at said second station operable to a plurality of positions, signalling devices individual thereto at said first station, synchronously operated means for consecutively associating each of said apparatus units with its signalling devices, means for operating said synchronous means in synchronism and means for controlling said last-mentioned means to stop said synchronous device when a signalling device which does not agree with the condition of said apparatus unit is reached.

12. In a supervisory control system, a first station, a second station, apparatus units at said second station, operating means individual thereto at said first station having a plurality of positions for operating said apparatus units to either of its positions, synchronous means for consecutively associating each of said apparatus units with its signalling devices and means for stopping said synchronous means when an operating means is reached whose condition does not agree with the position of said apparatus unit.

13. In a supervisory control system, a first station, a second station, apparatus units at said second station, signalling devices individual thereto at said first station, a driving circuit connecting said station, synchronous means for consecutively associating each of said apparatus units with its signalling devices, said synchronously operating means being operated by said driving circuit and means for controlling said driving circuit to stop said synchronous means when a signalling device is reached which does not agree with said apparatus unit.

14. In a supervisory control system, a first station, a second station, a plurality of apparatus units at said second station, a selecting relay individual to each of said apparatus units at said second station, a selecting relay for each of said second stationary relays at said first station, a rotating device at each of said stations provided with an operating position for each of said selecting relays thereat, a drive line connecting said stations, means for alternately opening and closing said drive line, means responsive to the alternate opening and closing of said drive line for operating said rotating devices in synchronism, means responsive to the synchronous operation of said devices for energizing associated selecting relays at each station simultaneously and means responsive to the energization of said associated selecting relays at each of said stations for alternately opening and closing said drive line.

15. In a signalling system, a first station, a second station, a plurality of apparatus units at said second station, a selecting relay individual to each of said apparatus units at said second station, a selecting relay individual to each of said second station selecting relays at said first station, a rotating device at each of said stations, a drive line connecting said stations, means for closing said drive line, means responsive to an impulse transmitted over said closed drive line for moving said switches in synchronism and for simultaneously opening said drive line, means responsive to the movement of said switches to a predetermined position for energizing associated selecting relays at each of said stations and means responsive to the energization of said selected relays at each of said stations for closing said drive line.

16. In a signalling system, a first station, a second station, a plurality of apparatus units at said second station, a selecting relay individual to each of said apparatus units at said second station, a selecting relay individual to each of said second station selecting relays at said first station, a rotating device at each of said stations, a drive line connecting said stations, means for closing said drive line, means responsive to an impulse transmitted over said closed drive line for turning said switches in synchronism and for simultaneously opening said drive line, means responsive to the movement of said switches to a predetermined position for energizing associated selecting relays at each of said stations, means responsive to the energization of said selected relays at each of said stations for closing said drive line, an operating key individual to each of said selecting relays at said first station and means controlled by the operation of any one of said keys for preventing the operation of said drive line closing means following the energization of the associated selecting relay, whereby said selecting relays can be brought to a stop at any desired position.

17. In a signalling system, a first station, a second station, a plurality of apparatus units at said second station, a selecting relay individual to each of said apparatus units at said second station, a selecting relay individual to each of said second station selecting relays at said first station, a rotating device at each of said stations, a drive line connecting said stations, means for closing said drive line, means responsive to an impulse transmitted over said closed drive line for turning said switches in synchronism and for simultaneously opening said drive line, means responsive to the movement of said switches to a predetermined position for energizing associated selecting relays at each of said stations, means responsive to the energization of said selected relays at each of said stations for closing said drive line, an operating key individual to each of said selecting relays at said first station, means controlled by the operation of any one of said keys for preventing the operation of said drive line closing means following the energization of the associated selecting relay, whereby said selecting relays can be brought to a stop at any desired position, and means including said selecting relays for selectively operating said apparatus units from said first station.

18. In a supervisory control system, a first station, a second station, a plurality of apparatus units at said second station, a selecting relay individual to each of said apparatus units, at said second station, a selecting relay individual to each of said second station selecting relays at said first station, a sequence switch at each of said stations, each of said sequence switches being provided with an operate position for each of said selecting relays, a drive line connecting said stations, means controlled by the synchronous operation of said selecting relays for transmitting impulses over said drive line, means responsive to said impulses for operating said sequence switches in synchronism, means responsive to the synchronous operation of said sequence switches for energizing the associated selecting relays as the sequence switches close their associated operating positions and means responsive to the synchronous operation of said selecting relays for alternately opening and closing said drive line for controlling the transmission of said drive impulses over said drive line.

19. In a supervisory control system, a first station, a second station, a plurality of apparatus units at said second station, a selecting relay individual to each of said apparatus units at said second station, a selecting relay individual to each of said second station selecting relays at said first station, a sequence switch at each of said stations, each of said sequence switches being provided with an operating position for each of said selecting relays, a drive line connecting said stations, means controlled by the synchronous operation of said selecting relays for transmitting impulses over said drive line, means responsive to said impulses for operating said sequence switches in synchronism, means responsive to the synchronous operation of said sequence switches for energizing the associated selecting relays as the sequence switches close their associated operating positions, means responsive to the synchronous operation of said selecting relays for controlling the transmission of said drive impulses over said drive line and means including said selecting relays for selectively operating said apparatus units from said first station.

In testimony whereof, I have hereunto subscribed my name this 31st day of March, 1924.

THOMAS U. WHITE.